(12) United States Patent
Bostleman et al.

(10) Patent No.: US 6,850,939 B2
(45) Date of Patent: Feb. 1, 2005

(54) SYSTEM AND METHOD FOR PROVIDING SELECTIVE DATA ACCESS AND WORKFLOW IN A NETWORK ENVIRONMENT

(75) Inventors: Mark W. Bostleman, Sylvania, OH (US); Jeffrey P. Pappas, Oregon, OH (US); Mallikarjun Nallamothu, Reston, VA (US); Nathan D. Buzdor, Toledo, OH (US)

(73) Assignee: ProjectVillage, Holland, OH (US)

( * ) Notice: Subject to any disclaimer, the term of this patent is extended or adjusted under 35 U.S.C. 154(b) by 546 days.

(21) Appl. No.: 09/726,745

(22) Filed: Nov. 30, 2000

(65) Prior Publication Data
US 2002/0065798 A1 May 30, 2002

(51) Int. Cl.[7] .............................................. G06F 17/30
(52) U.S. Cl. .............................. 707/9; 707/10; 709/223
(58) Field of Search .................... 707/1–10, 100–104.1, 707/200–205; 705/34, 1, 7–8, 10–37, 11; 709/223, 227

(56) References Cited

U.S. PATENT DOCUMENTS 6,161,113 A * 12/2000 Mora et al. .................. 715/505
6,502,102 B1 * 12/2002 Haswell et al. ............. 707/102
2002/0103731 A1 * 8/2002 Barnard et al. ............... 705/34

* cited by examiner

Primary Examiner—Mohammad Ali
(74) Attorney, Agent, or Firm—Emch, Schaffer, Schaub & Porcello Co., L.P.A.

(57) ABSTRACT

A method for managing and selectively sharing multiples sets of information to be used in a plurality of projects is disclosed. Each set of information is created, revised and controlled by separate entities. The method is executed in a computer system where at least one first set of information and at least one second set of information is received from at least a first entity. A second entity is permitted to retrieve, use and/or revise the first set of information, while at the same time the second entity is prohibited from retrieving, using and/or revising of the second set of information. At least one third set of information and at least one fourth set of information are received from the second entity. The first entity is permitted to retrieve, use and/or revise the third set of information, while the first entity is prohibited from at least one of retrieving, using or revising of the fourth set of information.

40 Claims, 15 Drawing Sheets

Menu Structure

Menu Structure

SYSTEM AND METHOD FOR PROVIDING SELECTIVE DATA ACCESS AND WORKFLOW IN A NETWORK ENVIRONMENT

FIELD OF THE INVENTION

The present invention relates to data storage and management systems and in particular to methods for managing multiple sets and subsets of workflow processes and selectively shared data which are used in a plurality of projects by a plurality of organizations, each with a plurality of users.

According to the method of the present invention, a single source of information is used for all of an organization's projects. That is, the locations and the methods by which a project is managed are efficiently reduced to one system. The system allows users to store and access data and to selectively share data with others.

BACKGROUND OF THE INVENTION

Increasingly, computer based tools are being relied upon to assist businesses in solving a wide range of problems. Computers are especially useful for organizing and managing large quantities of information. There is a particular need to manage and streamline the flow of information in complex projects. However, significant flaws exist in the architecture of currently known project management applications. Within any team of organizations working on a project, one organization (usually the organization that licenses a project management software product) owns and manages all of the information on the project. Therefore, this organization receives a high benefit while all other organizations receive only moderate benefits. By extension, the project does not fully realize the potential of the technology.

Any project that involves the collaboration of multiple organizations requires continuous communication between these organizations in the form of creating, copying and transporting information.

A project typically begins when each organization involved in the project creates a body of information and breaks that information into at least three subsets. The largest subset is copied and transported to all of the other organizations. Of the two subsets left, one is copied and transported to some, but not all, of the other organizations. The remaining subset is not copied or transported, but stored and used only within the organization that created it.

As the project proceeds, each organization continues to create new information on a daily basis, which is again broken into subsets, and the copy—transport—store—process is repeated. Through this, a team mechanism evolves in which each player holds an island of copied instructions that is essential in order to perform its work. Furthermore, the copy—transport—store—process does not stop between organizations, but occurs within organizations as well. Each organization has a number of its own islands in the form of headquarters, departments, branch offices, field offices, traveling personnel and the like.

If one organization's (or part of an organization's) set of instructions is not up to date, it will not be able to perform its work or, worse, will perform it incorrectly. An important factor in the efficiency of a team, then, becomes the rate and accuracy at which the instructions are copied and synchronized. Because of this, the copy and synchronization process consumes a great deal of time and resources within each organization and, thus, the project.

There was a need to create a method for utilizing a central store in which the information and communications from each organization was created and shared with all, some, or none of the other organizations. This approach eliminated the copy and transport chores. There was no longer a "rate" at which the information was transported because it was created in-place and was available to anyone as soon as it was created. The idea of the "accuracy" of the copy was no longer relevant because each organization was using the original, not a copy.

However, this central store method has been discussed more times than implemented. Unless a project was very large and lasted for several years, the cost to assemble and maintain such a dedicated network between all organizations could not be justified.

Recently, the Internet or World Wide Web has emerged as a ubiquitous, low-cost public infrastructure. Not only is the Internet capable of acting like a dedicated project network, it is also well suited for carrying an application like the central store model above.

The construction industry is an example of where web-based project management services are starting to change how business is done. The following detailed description of both past project management services and the system of the present invention are described herein for a construction industry organization for the sake of example. The system of the present invention is useful in a variety of industries and such construction industry example should be viewed in an illustrative and not limiting manner. The system of the present invention has broad applications and uses in many industries and such uses are within the contemplated scope of the present invention.

From its beginning, the management of construction projects on the Internet has centered on the concept of Project Specific websites; that is, a website specifically created for one project. Using the prior art Project Specific Model, as shown in FIG. 1, the organization that hosted a project created an organizational account, 10, just for that project. Thus, if multiple projects were to be hosted within the Internet application by one organization, a new organizational account had to be created for each project.

The Project Specific Model created inefficiencies in the form of redundancy and lack of shared resources. Master lists of data 11 and 12 such as companies, cost codes and usernames had to be copied and recreated for each new project. For example, in FIG. 1, User 1 had three usernames and passwords 20 one for each project. Using a security model like this, to effectively distribute all of the information for all of it's projects to all of it's employees, a company with 60 employees and 30 projects per year would have to create and maintain 1800 usernames and passwords per year.

Additionally, because each project logically resided in separate organizational accounts 10, there was no functionality for data to be aggregated across projects; for instance, reporting on total man-hours on all projects or total costs for projects 1 and 2 is not possible. Since a user had to log-out and log back in to each project separately, the Project Specific Model also had an awkward process for switching from one project to the next while using the application. Furthermore, in some applications built on the Project Specific Model, each project had to be accessed by entirely different URLs, or addresses on the Web.

Because of these inefficiencies in usability, the Project Specific Model could not be deployed in an enterprise-wide approach. That is, within or across organizations, all projects could not be managed effectively using an Internet application with this model. Instead, some projects would be on the Web and the rest of the projects would be tracked in other applications on the organizations' local area networks (LANs) or by conventional hard copy methods. Thus, the benefit of online collaboration between organizations and remote access to data was offset by the cost of disintegrating enterprise-wide information and format.

An alternative to the Project Specific Model was the prior art Enterprise Model. An Enterprise Model application, as shown in FIG. 2A, allowed one organizational account 30 to hold multiple projects. Because of this, one set of master lists 31 could be shared between all of the projects within an organizational account.

Because each organizational account enforced security between all of the users and projects within it, a user needed only one username and password for each organization as opposed to each project. Thus, in FIG. 2A, User 1 had only two usernames and passwords 40 one for each organization that held a project in which User 1 was involved.

Various currently used Enterprise Model approaches are the web-based project management applications built by Cephren, Bidcom, Buzzsaw and Constructware. These Enterprise Model applications are not only designed for, but provide the most benefit to, those organizations that track every project from it. In the Enterprise Model, the host organization has a single source of project information enterprise-wide, providing efficiencies in the form of common access and format across projects as well as the ability to aggregate data between projects (for example, total dollar volume of retail vs. healthcare or, workload statistics across all project managers). Furthermore, in the Enterprise Model, all projects are presented at one Web address and each user has one username and password for each organization. The applications' security features then discern what parts of what projects to make available to a given user.

While the Enterprise Model provides greater efficiency for those organizations hosting project information, other team members, or those organizations working on the project but not hosting project information in the system, are left with many of the same integration problems that hosting organizations faced with the Project Specific Model. That is, data and work processes on other projects in the enterprise reside on another system. For example, in FIG. 2A, assume that User 1 is from a third company, not pictured, called Organization C which is involved in three other projects, not pictured, Project 4, Project 5 and Project 6. Because Projects 4, 5 and 6 do not involve Organization A or B, Organization C must manage these projects in another system. Even if Organization C had its own account in the Web application to house and manage Projects 4, 5 and 6, the information in the projects would not be integrated with that of Projects 1, 2 and 3 because they would be in organizational accounts other than its own.

This illustrates the major drawback of Enterprise Model systems: just as the Project Specific Model does not allow aggregation and integration between projects, the Enterprise Model does not allow aggregation and integration between organizations. Because of this, one organization must act as a public clearinghouse for all data and work processes on a particular project. FIG. 2B shows an example of this prior art system in which all lines of communication between five organizations run to and from one organization, the host. In the offline world, however, multiple organizations share information with each other in a complex network of privileges and permissions defined, in part, by each organization involved, not by one omnipotent organization. FIG. 2C illustrates this, where lines of communication exist between each organization allowing the information to be shared between any two organizations on their own terms. For example, given all of the data created by Organization C, a portion will be made available to all of the other organizations while another portion will be made available to only Organization D. Yet another portion may only be made available to Organization E. The remaining portion is not shared with any other organizations, but distributed within Organization C for internal use only.

In the Enterprise Model, this level of control over the distribution of information between multiple organizations is only possible for that information that is shared between the hosting organization and other organizations, not between multiple "other members". Technically, the hosting organization could employ the security features of its site to create these complex gateways between "Other Members", but it would be awkward at best and incomplete at worst. For example, in FIG. 2B, if Organization C wanted to share information with Organization D, but not with Organization A (the Host), Organization C would have to trust Organization A to essentially not look at the information. Even here, while the honest hosting organization would not make itself privy to the content of the information, it still knows the type of information being shared and that the information is not being shared with it.

Both the Project Specific and Enterprise models are carryovers of application structures that operated on Local Area Networks (LANs). Prior to the wide use of the Internet, each organization had only its own LAN that was a network in and of itself, not connected to any other organizations' LAN. Since there was no physical connection tying these networks or their applications together, extending the application models to allow integration between organizations returned no value. However, as the Internet emerged to connect the information infrastructures between organizations, the current offering of Web based applications appeared and were created utilizing the LAN-based Project Specific and Enterprise Model approaches.

In this sense, these applications were simply ported, as is, from LANs to the Internet. As a result, the communication model that emerges when a group of organizations uses these applications on a number of projects is paradoxical in that numerous, disconnected, virtual LANs are formed on top of a large shared network. This happens because the Project Specific and Enterprise models do not take advantage of the unique opportunities provided by a large network shared by multiple organizations.

In view of the various shortcomings of the existing project management models, there is a substantial need for an improved computer based application that provides a complex fabric of data, communication, and workflow exchange to all members of a project based supply chain.

SUMMARY OF THE INVENTION

It is a primary object of the present invention to provide an improved system where every organization controls its own space and creates its own information, workflow and communications for the projects in which it is involved. Each piece of that information can then be made visible to all, some, or none of the other organizations is that are involved in the projects.

When used by multiple organizations in a community, the structure of the present invention multiplies the benefits returned not only to the community of organizations as a whole, but to each organization involved. As it fosters a regional best practice approach to collaboration, this return increases with the number of organizations participating.

Yet another object of the present invention is to provide a system which runs from a single location on web and database servers. Any member of a participating organization can connect to the Internet, log in, and start working. Organizations are not required to purchase, configure or install any software or hardware. The only requirement to use the system is a connection to the Internet and a Web browser. For most organizations, this is already in place.

To achieve the foregoing and other objects, a preferred embodiment of the present invention is generally directed to an Enterprise Community method and system that enables a complex fabric of information exchange between multiple organizations while retaining the benefits of the Enterprise Model for every organization. In the system of the present invention, the project, as a subject of collaboration, is moved out of organizational containers. The project in the Enterprise Community system of the present invention is used as a common channel upon which multiple organizations can attach and, optionally, share their organization-specific content.

In one specific embodiment of the invention, an Enterprise Community System of the present invention is implemented in an Internet-type environment with computers having a graphical user interface. When a user starts a new project, the Enterprise Community system displays a template or screen for receiving information about that project and guides the user through the Enterprise Community system. The system enables the user to retrieve and, if desired, revise, previously stored information for use in the new project.

In the case of multiple users, either within one organization or from different organizations, the Enterprise Community system enables each user to access and revise at least certain portions of the information stored in the Enterprise Community system. The Enterprise Community system ensures that the information is shared only among those users who are authorized to have access to that information. The Enterprise Community system also ensures that certain steps in workflow processes are carried out in a predetermined sequence. As these steps are carried out, the Enterprise Community system, stores and transmits information concerning the status of each step and the information relating to that step to the various authorized users.

The Enterprise Community system enables multiple users to work simultaneously on complicated projects and to share subsets of information while simultaneously protecting other subsets of information from other users of the Enterprise Community system.

One advantage of the Enterprise Community system of the present invention is that each user can store, revise and retrieve general information which is not specific to any one project.

Another advantage of the Enterprise Community system is that each user is constantly updated as to the status of the various steps in workflow process that are under his control or direction or where the user has been designated to know certain information.

According to the method of the present invention every organization owns and controls its own information and can share any part of that information with any other organization it chooses.

Because the method is designed to maximize the benefits of the Internet for all organizations involved in multiple projects, it is useful as a standard in any community where a number of organizations regularly collaborate. In this way, the community, as a whole can reduce costs, increase productivity and, in the end, increase the quality of its product.

BRIEF DESCRIPTION OF THE DRAWINGS

The accompanying drawings incorporated in and forming a part of the specification illustrate several aspects of the present invention, and together with the description serve to explain the principles of the invention.

DETAILED DESCRIPTION OF THE PREFERRED EMBODIMENTS

Figure 1:
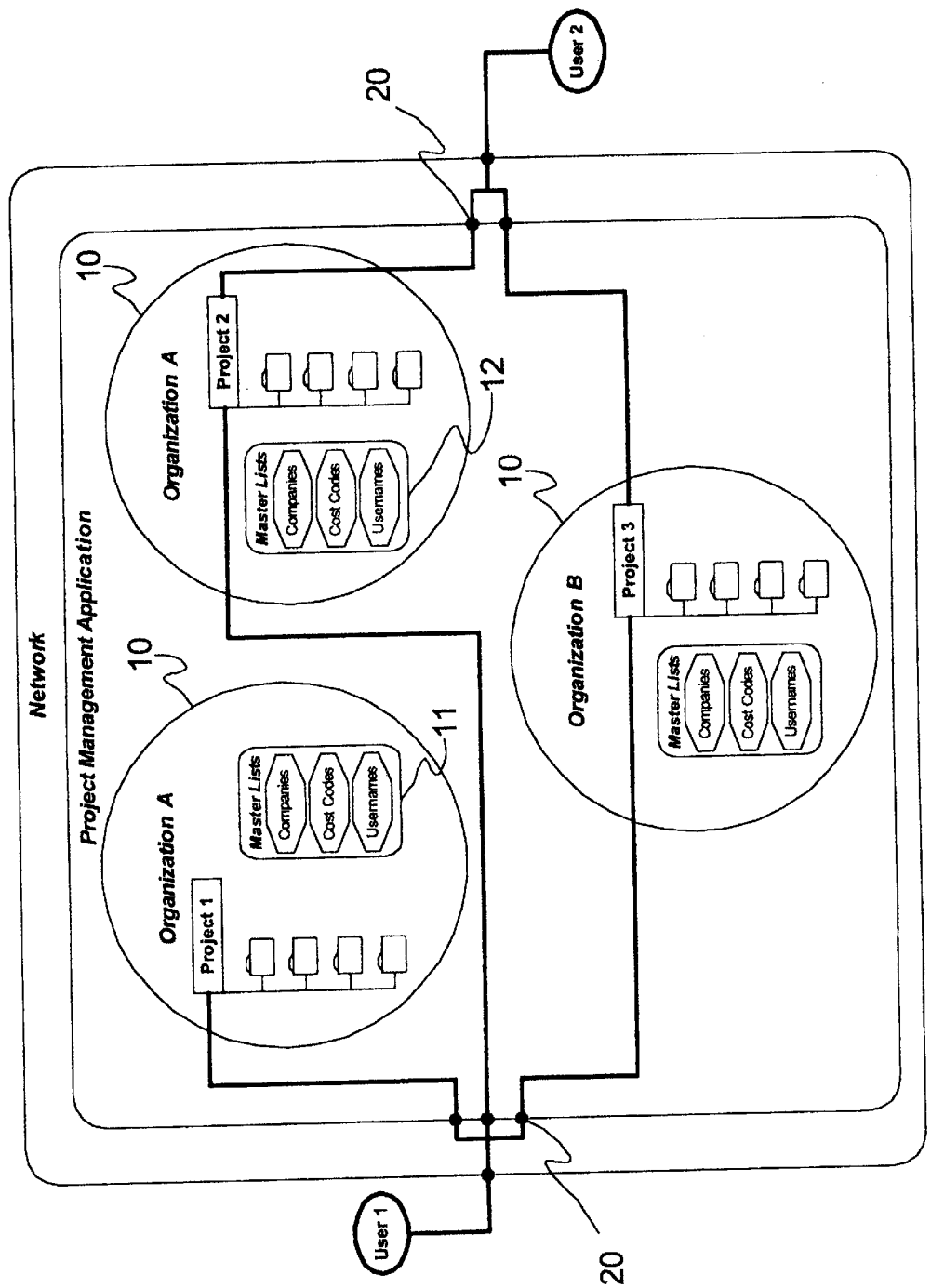
FIG. 1 is a block diagram of a typical prior art Project Specific data management model.
Figure 2A:
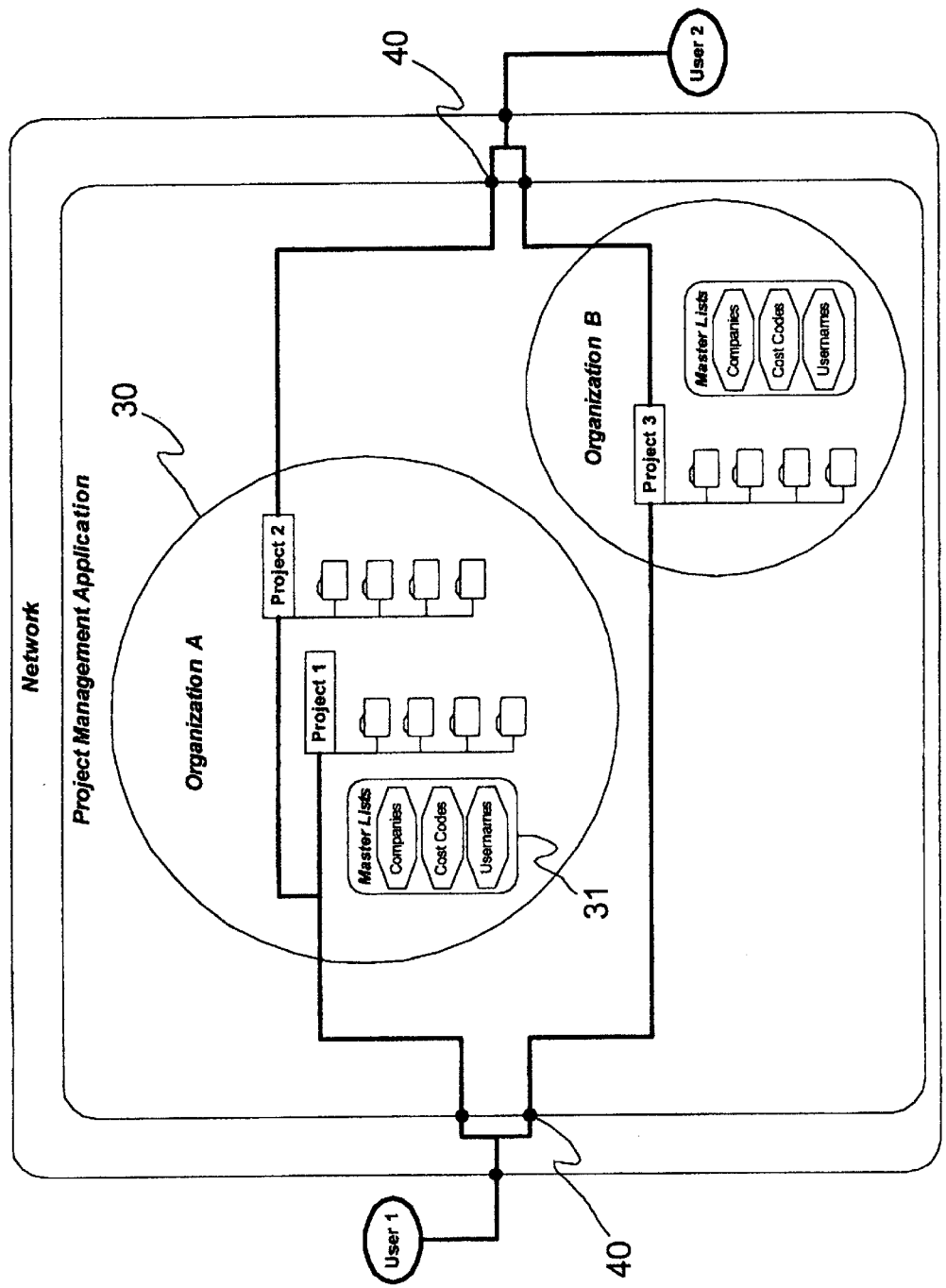
FIG. 2A is a block diagram of a typical prior art Enterprise data management model.
Figure 2B:
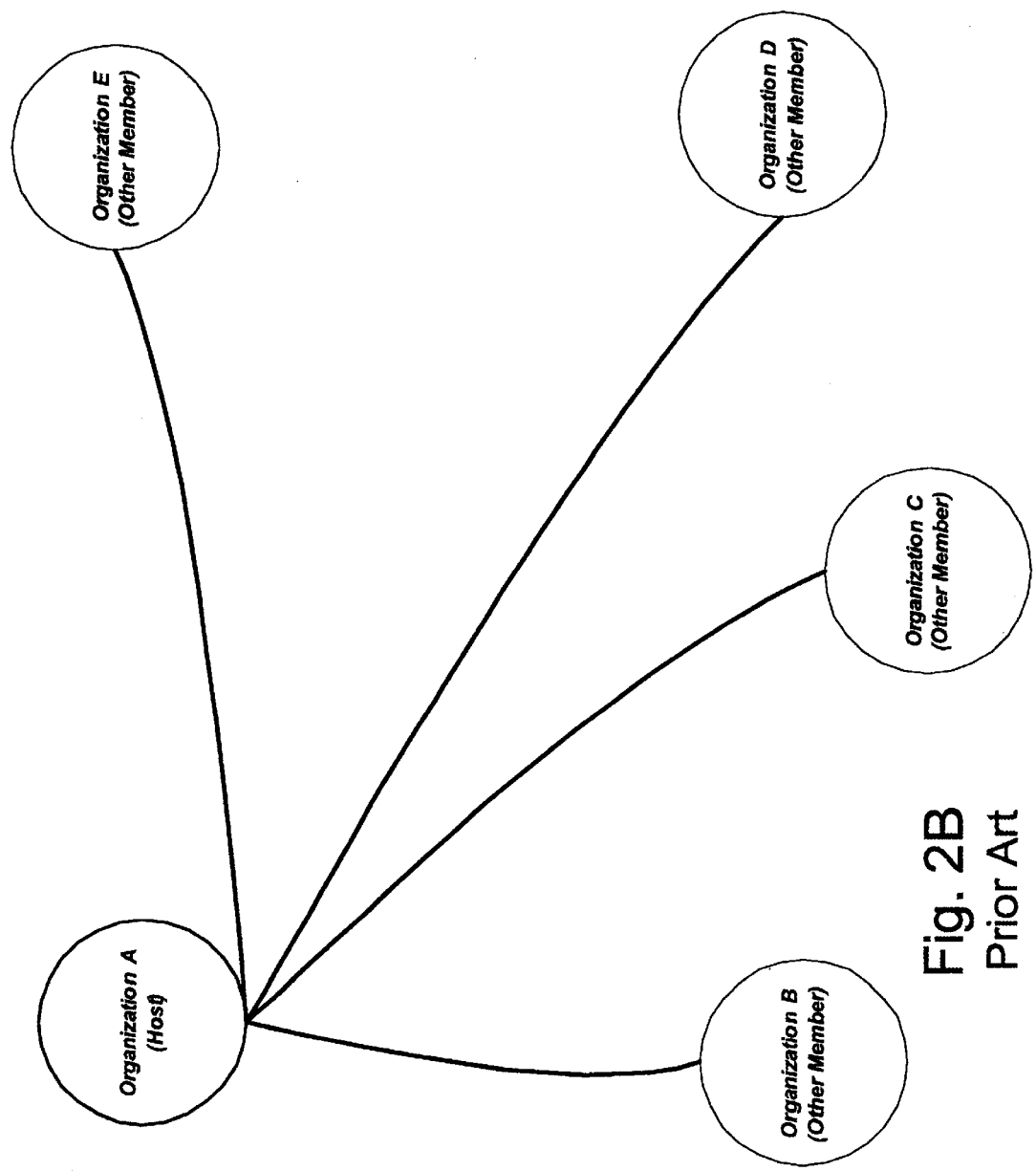
FIG. 2B is a diagram illustrating the paths of communication between organizations using the prior art Project Specific or Enterprise data management model.
Figure 2C:
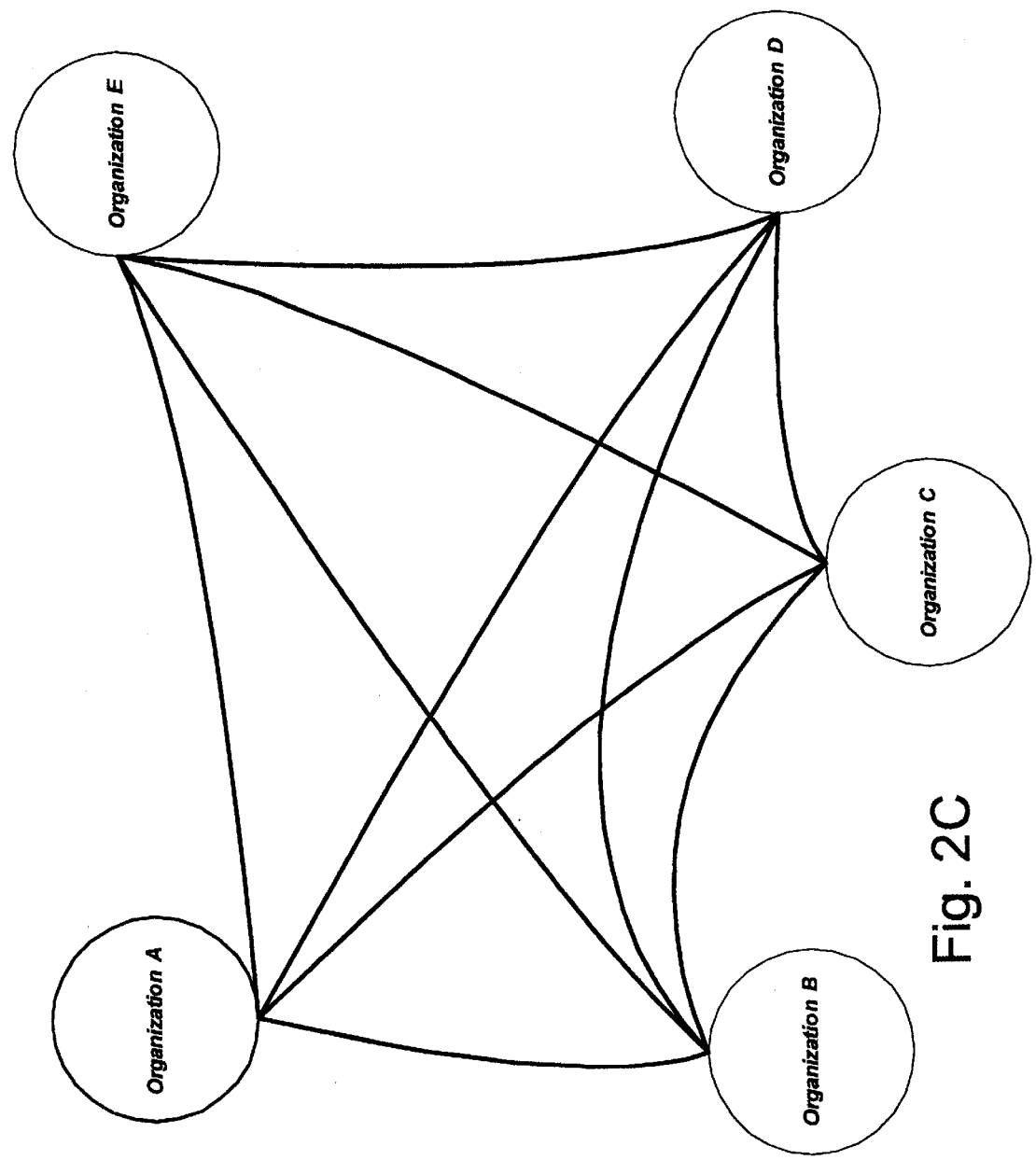
FIG. 2C is a diagram illustrating the paths of communication between organizations using an Enterprise Community system of the present invention.

The present invention relates to a method for managing and selectively sharing multiple sets of information to be used in a plurality of projects. Each set of information is created, revised and controlled by separate organizations, or entities. According to the present invention, at least one first set of information from at least a first entity is received, stored, and analyzed in a database. The first set of information is capable of being retrievable, usable and revisable by at least the first entity. The first entity controls whether at least one second entity can access the first set of information. The first entity is allowed to control whether the second entity can retrieve, use and/or revise the first set of information.

At least one second set of information from the first entity is received, stored, and analyzed in the database. The second set of information is capable of being retrieved, used and revised only by the first entity. At least one third set of information from the second entity is received, stored, and analyzed in the database. The third set of information is capable of being retrieved, used and revised by at least the second entity. The second entity controls whether at least the first entity can access the third set of information. The second entity is allowed to control whether the first entity can retrieve, use and/or revise the second set of information. At least one fourth set of information capable of being retrieved, used and revised only by the second entity is received, stored and analyzed in the database. According to the present invention, multiple entities can send and store multiple sets of information in the database. Each entity controls whether the other entities can retrieve, use and/or revise the stored sets of information.

Analysis of the information can include updating the status of each set of information, and sending the status of each updated set of information to each entity that is capable of retrieving, using and/or revising the updated set of information. The analysis of the information is performed using a predetermined and, if desired, customizable path. The method of the present invention is preferably executed in a computer system where the receiving, analyzing and storing of the sets of information are performed on a network computer with a computer code operating on a suitable database. In preferred embodiments, the computer code is written in a language such as C++, Java, Visual Basic and the like.

The present invention also provides a software program for a multiple project managing system which controls access to multiple sets of information for use in a plurality of projects. Each set of information is created, revised and controlled by separate entities. The software program comprises instructions for allowing a computer to receive, store, and analyze in a database at least one first set of information from at least a first entity using an electronic user interface. The first set of information is capable of being retrievable, usable and revisable by the first entity. The program allows the first entity to control whether at least one second entity can have access to the first set of information and whether the second entity can retrieve, use and/or revise the first set of information. The program also allows the computer to receive, store and analyze in the database at least one second set of information from the first entity. The second set of information is capable of being retrieved, used and revised only by the first entity. The program also allows the computer to receive, store, and analyze in the database at least one third set of information from the second entity. The third set of information is capable of being retrieved, used and revised by the second entity. The software program allows the second entity to control whether the first entity can access to the third set of information and whether the first entity can retrieve, use and/or revise the second set of information. The program also allows the computer to receive, store and analyze in the database at least one fourth set of information from the second entity. The fourth set of information is capable of being retrieved, used and revised only by the second entity.

The software program controls whether multiple entities can send, store and analyze multiple sets of information in the database. The software program allows multiple entities to control whether the other entities can retrieve, use and/or revise the stored sets of information. The present invention also provides a computer-readable medium having computer-executable instructions for performing the steps recited above.

According to the present invention, an electronic interface is used to receive the first and second sets of information from the first entity. The computer analyzes and stores the first and the second sets of information in a database and allows a second entity to retrieve, use and/or revise the first set of information, while prohibiting the second entity from at least one of the retrieving, using or revising of the second set of information. The electronic interface is also used to receive the third and fourth sets of information from the second entity. The computer analyzes and stores the third and the fourth sets of information in the database and allows the first entity to retrieve, use and/or revise the third set of information, while prohibiting the first entity from at least one of the retrieving, using or revising of the fourth set of information. The analysis of the information includes updating the status of each set of information, and sending the status of each updated set of information to each entity that is capable of retrieving, using and/or revising the updated set of information.

The present invention is useful for managing and selectively sharing information in a multiuser network environment of the type having at least one database server with at least one file directed for selective shared usage, and multiple entities interconnected through the database server through a network link. Each entity creates at least one set of information and controls access by other entities to at least one subset of that information.

The present invention provides a method for one or more entities for managing multiple projects and selectively sharing information. At least one or more accounts are created within an application. Each entity creates and controls at least one or more of the following sets of information including one or more projects, application modules, security permissions and users. Each entity is allowed to create any number of projects. When a specific project is created, the specific project has a number of application modules associated with the specific project that contain and process at least one or more sets of information. Each entity is allowed to grant foreign and/or local permission to a user to view and/or modify the information. A super project is created when a foreign permission is granted to the user. The super project is a common channel upon which the various application modules from each entity can be merged into at least one set of super modules.

The present invention also provides a programmed computer system for managing and selectively sharing multiple sets of information in a network environment. At least one client device comprises at least one or more personal computers, network appliances, laptop and palm computers and the like. The client device includes a user interface which sends information to and receives information from a connection device. The connection device comprises at least one or more routers, switches and domain name servers and the like. The connection device includes a network which sends and receives information from an interface server. The interface server includes a request/response handling system which sends and receives information from an application server. The application server comprises a data and security validation system which receives information from the request/response handling system. The data and security validation system sends and receives information from a business rule processing system. The data and security validation system also sends information to an interface assembly which, in turn, sends information to the request/response handling system. The business rule processing system sends and receives information from a database server, which comprises at least one or more tables, views and triggers.

Figure 3:
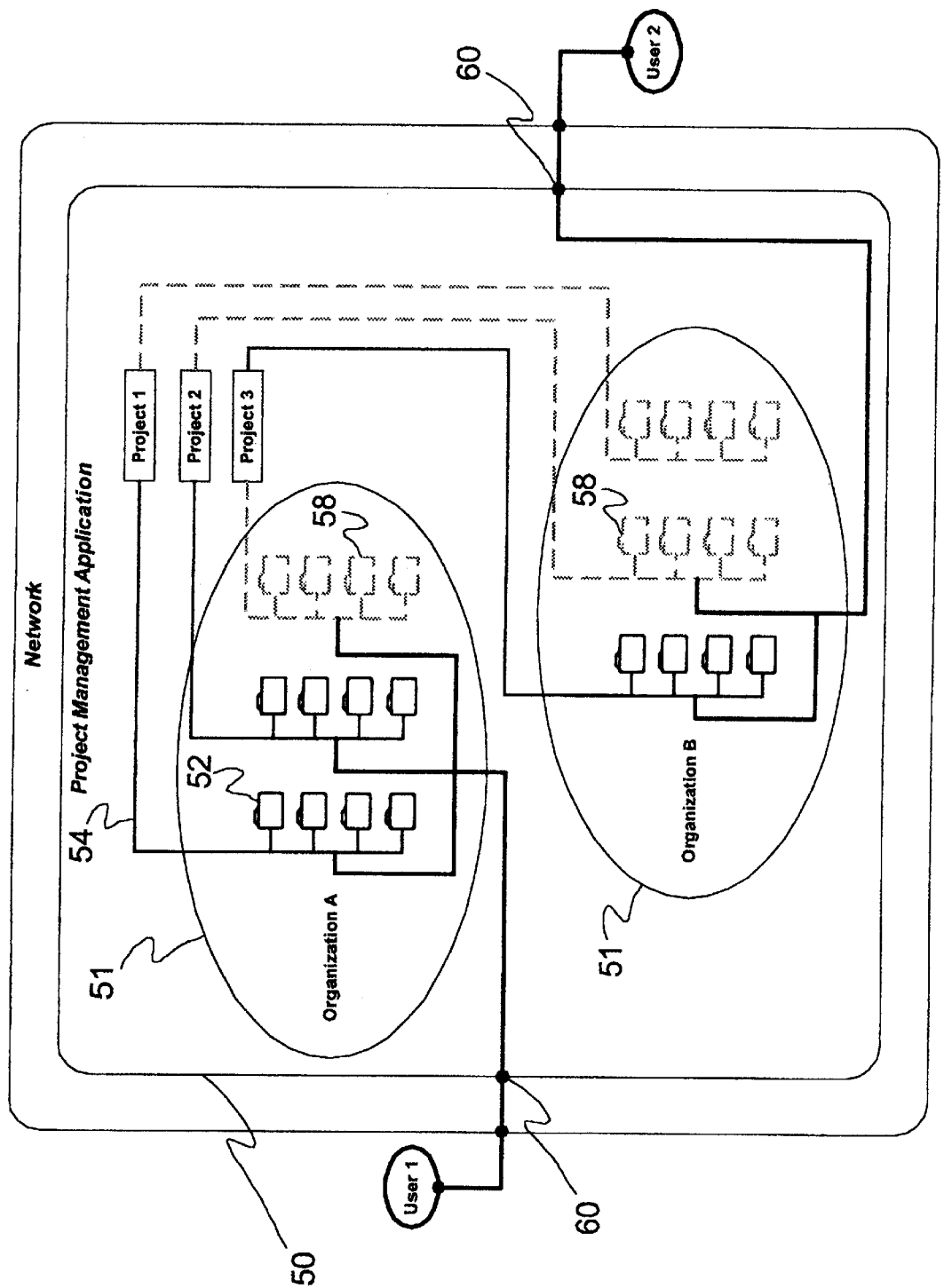
FIG. 3 is a block diagram of an Enterprise Community system of the present invention.

Referring now to the figures, FIG. 3 shows the functional characteristics of an Enterprise Community system 50 of the present invention. In any given organizational account 51, sets of information or application modules shown as solid line folders 52, and broken line folders 58 are attached to a project channel 54. The solid line folders 52 represent content that is published from within that organization's account. The broken line folders 58 represent content published in a foreign organizational account, but made visible to the local organization. Since each organizational account controls the access by other organizations to its own content, any matrix of exchange is possible between any number of organizations and any number of projects. As previously described, the prior art Project Specific and Enterprise Models require a user to have a different username and password for each project or each organization that contained a project respectively. The Enterprise Community system, however, reduces this requirement to only one username and password 60 for the organizational account to which the user belongs.

Figure 5:
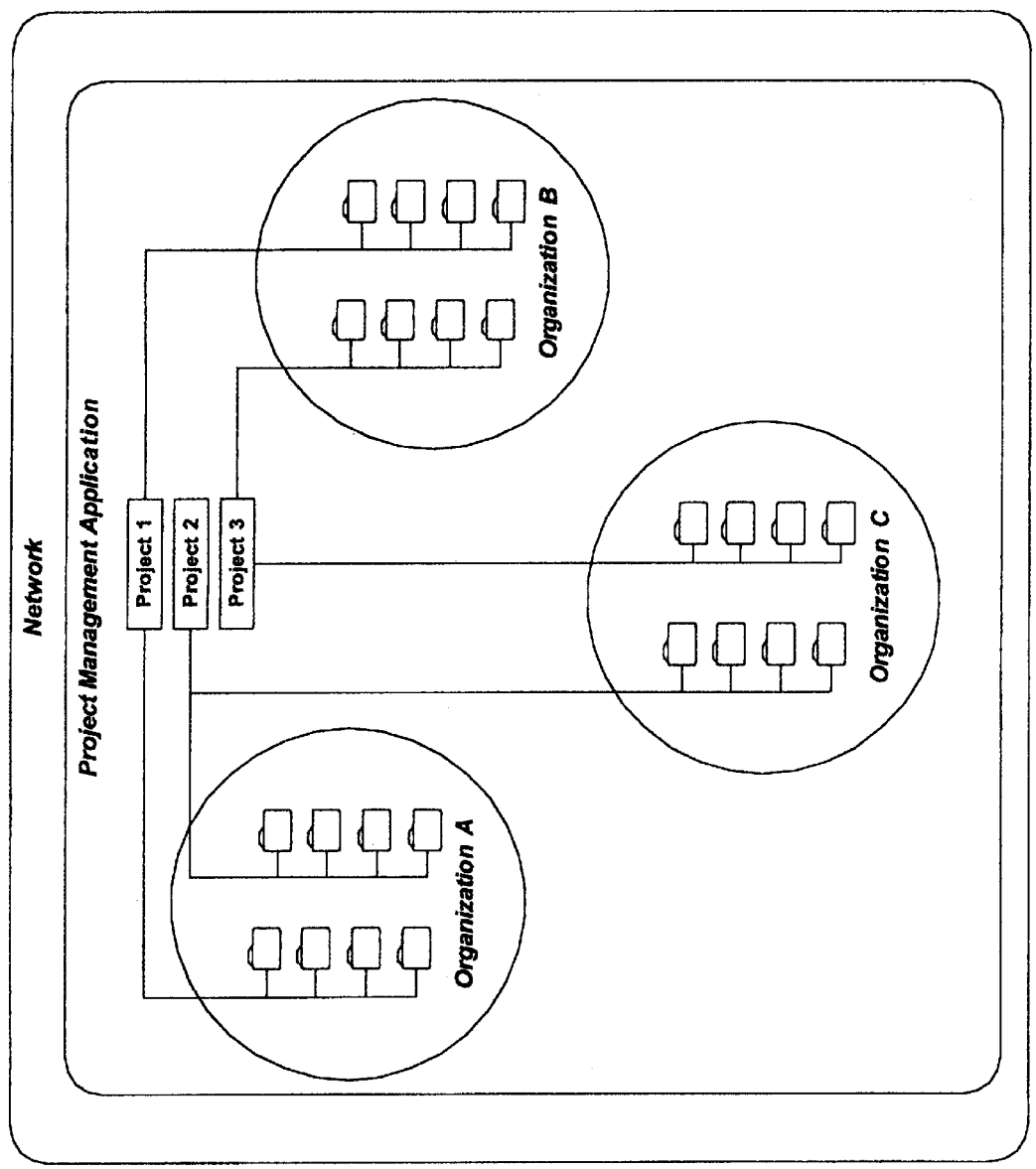
FIG. 5 is a block diagram of an Enterprise Community system object model illustrating multiple organizations collaborating on multiple projects in multiple combinations of partnerships.

The system of the present invention is useful for managing many diverse complex projects involving many organizations in a variety of partnership combinations. One example is the construction industry. While construction projects often include team members from a variety of geographic locations, there is generally a core community of regional organizations whose members, in one combination or another, are involved in all or most of the projects in that region. The Enterprise Community system provides value to these core communities in the form of a consistent work environment from project to project and fosters a regional best practice approach. FIG. 5 shows an example of this in which three organizations work on three projects in three combinations of partnerships, while each organization retains all of the information for all of its projects in its own organizational account.

In the Enterprise Community system, all participants in a project have and control their own organizational account, which holds their own information. All types of organizations, regardless of their role in a project, benefit from the system, not just the host organizations that exist in the Project Specific and Enterprise models, which are typically general contractors and architects. In addition, combinations of collaborative relationships can be formed that cannot exist in the Project Specific or Enterprise Models.

Figure 4:
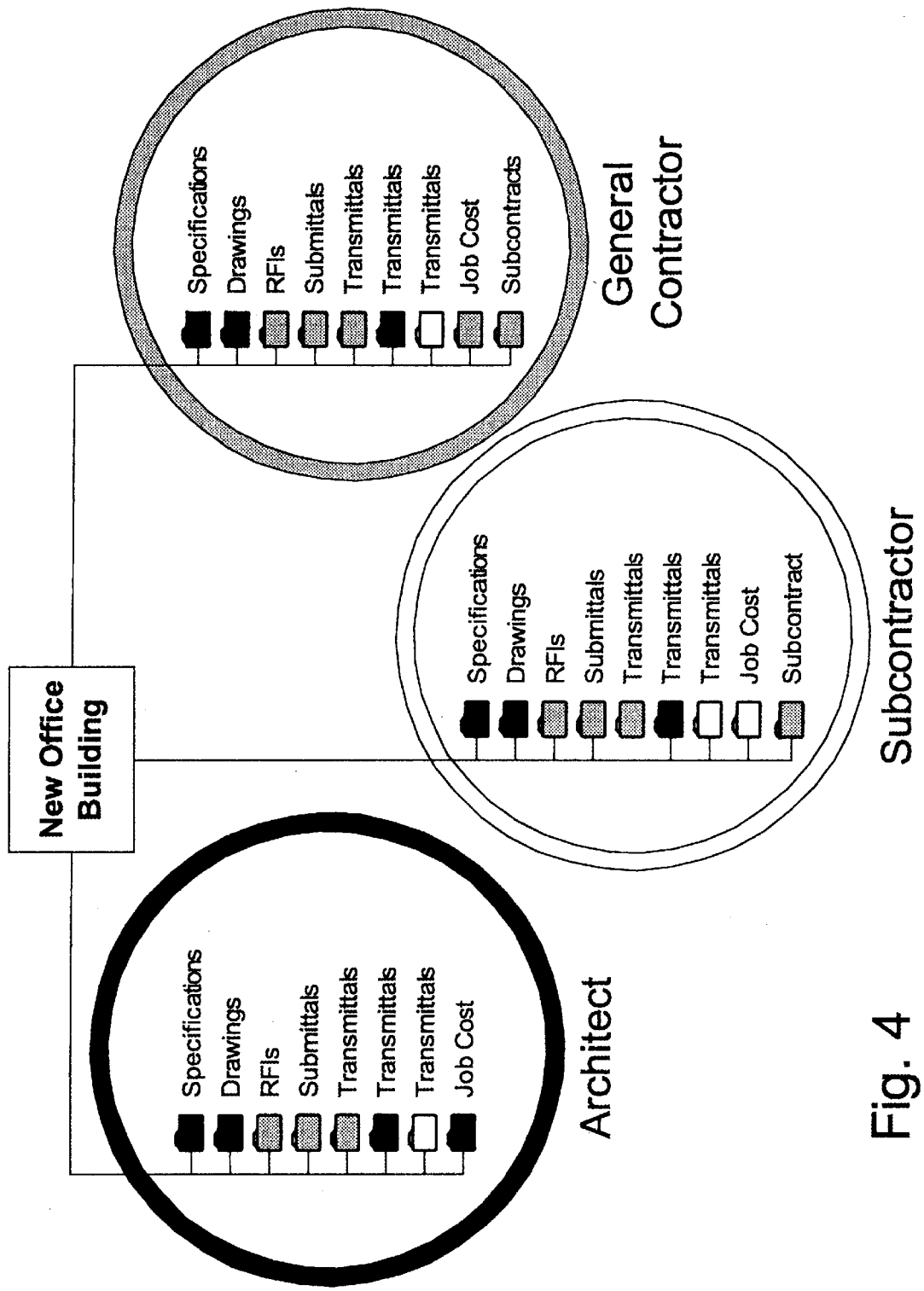
FIG. 4 is a block diagram showing a sample project in an Enterprise Community system.

FIG. 4 shows an example of an Enterprise Community system being used on an actual construction project by three organizations, an architect, general contractor and subcontractor. Each organizational account is represented by shading that carries through to any application module hosted by that organization. In this diagram are several combinations of information sharing that are unique to an Enterprise Community system. First, each organization is hosting its own job cost information, but is not sharing that information with any other organization. Second, the architect is hosting Drawings, Specifications and Transmittals and sharing them with all other organizations. Likewise, the general contractor is hosting RFIs, Submittals and Transmittals and sharing them with every organization. Third, the general contractor is hosting Subcontract information, but only sharing it with the Subcontractor. Fourth, for any given project, each organization may have available multiple application modules of the same type. For instance, each organization has available three Transmittal application modules, one hosted by each organization and shared with all other organizations.

Figure 7:
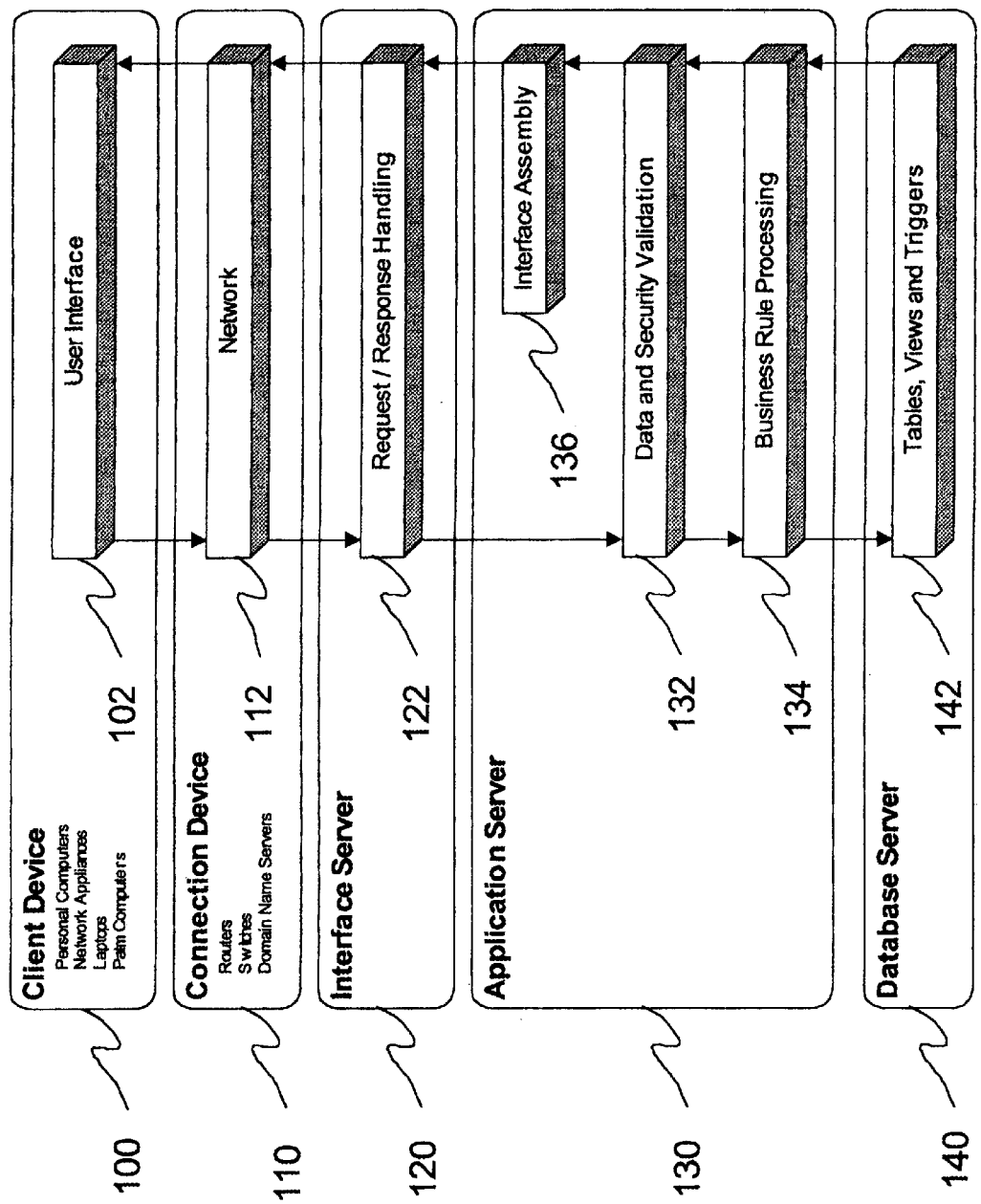
FIG. 7 is a block diagram of a system architecture for an Enterprise Community system.

Having generally described the concept of the Enterprise Community system, we now describe details of how to implement an embodiment of the invention. The system is preferably coded in programming languages such as Visual Basic, C++, Java and the like. The system architecture of an Enterprise Community system, is shown in FIG. 7, which is a flow chart describing the methods of the present invention operable within an Internet environment. A client device 100 can comprise at least one or more of the following: personal computers, network appliances, laptops, palm computers and the like. The client device 100 includes a user interface 102 which sends information to and receives information from a connection device 110. The connection device 110 can comprise at least one of the following: routers, switches, domain name servers and the like. The connection device 110 includes a network 112 which sends and receives information from an interface server 120. The interface server 120 includes a request/response handling system 122 which sends and receives information from an application server 130.

The application server 130 can comprise a data and security validation system 132 which receives information from the request/response handling system 122. The data and security validation system 132 sends and receives information from a business rule processing system 134. The data and security validation system 132 also sends information to an interface assembly 136 which, in turn, sends information to the request/response handling system 122.

The business rule processing system 134 sends and receives information from a database server 140, which can comprise at least one or more tables, views and triggers 142.

Figure 9:
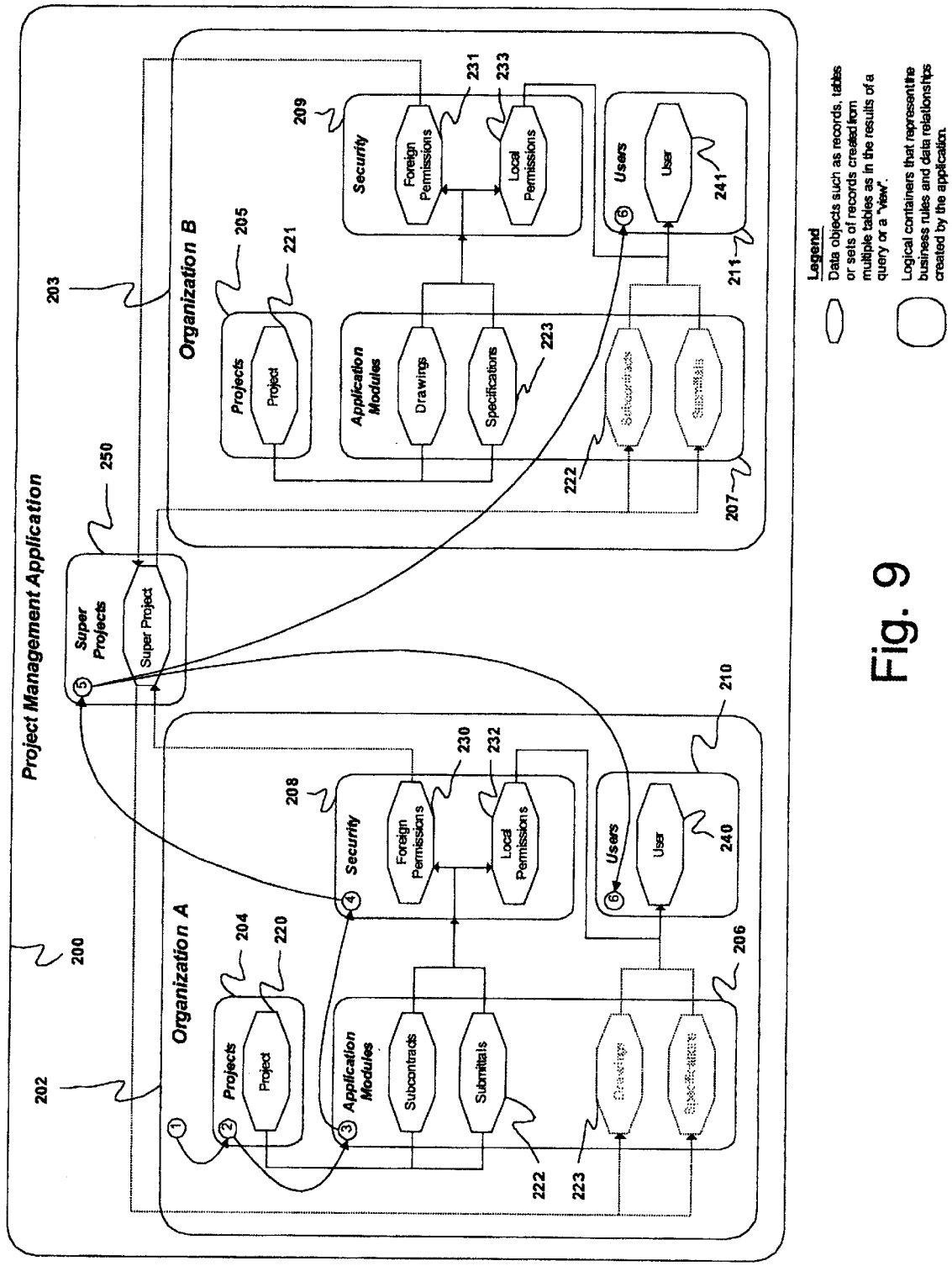
FIG. 9 is a block diagram of an application and database architecture for an Enterprise Community system.

The Enterprise Community system's application and database architecture is shown in FIG. 9 for a project management application for an organization A and an organization B. While many other organizational accounts can be included in the application and database architecture, such other organizational accounts are not shown in FIG. 9 for ease of description. However, the inclusion of multiple organizational accounts within the community enterprise system is within the contemplated scope of the present invention.

According to the present invention, and as shown in FIG. 9, the application and database architecture 200 is structured as follows:

First, organizational accounts 202 and 203 are created within an application 200. Organizational accounts 202 and 203 each contain and control their own collections of projects 204 and 205, application modules 206 and 207, security permissions 208 and 209, and users 210 and 211.

Second, each organizational account creates its own project 220 and 221.

Third, when the specific project 220 or 221 is created, the project will have a number of application modules 222 and 223 associated with it that contain and process various categories of data such as subcontracts, submittals, drawings and specifications.

Fourth, for each application module 222 or 223, the organizational account 202 or 203 grants local 232 and 233 and/or foreign 230 and 231 security permissions to specific users 240 or 241 to view and/or modify the data.

Fifth, if permissions are granted to a user 240 or 241 that is contained in another organizational account, the application creates a super project 250. A super project is used as a public "link" or common channel upon which the application modules 222 or 223 from several organizational accounts can be merged into one collection of application modules 206 or 207 for each organizational account.

Sixth, the user(s) 240 and/or 241 that were granted permissions 230 through 233 both foreign and local, then have available a single collection of application modules 206 and 207 that contain application modules 222 and 223 from a variety of organizational accounts.

The functionality that enables the Enterprise Community system is in the fourth step above in which an organizational account 202 or 203 can apply foreign permissions 230 or 231. If an organizational account such as Organization A 202 could not "see" a user 241 from another organizational account 203, foreign permissions 230 could not be applied. In this case, the super project 250 would not exist and, thus, application modules 222 could not be shared across organizational accounts. It is this model, in which there is no security visibility of users across organizational accounts, and thus no foreign permissions 230 and 231 and no super project 250, that typifies the architecture of the prior art in the Enterprise and Project Specific systems.

Figure 10:
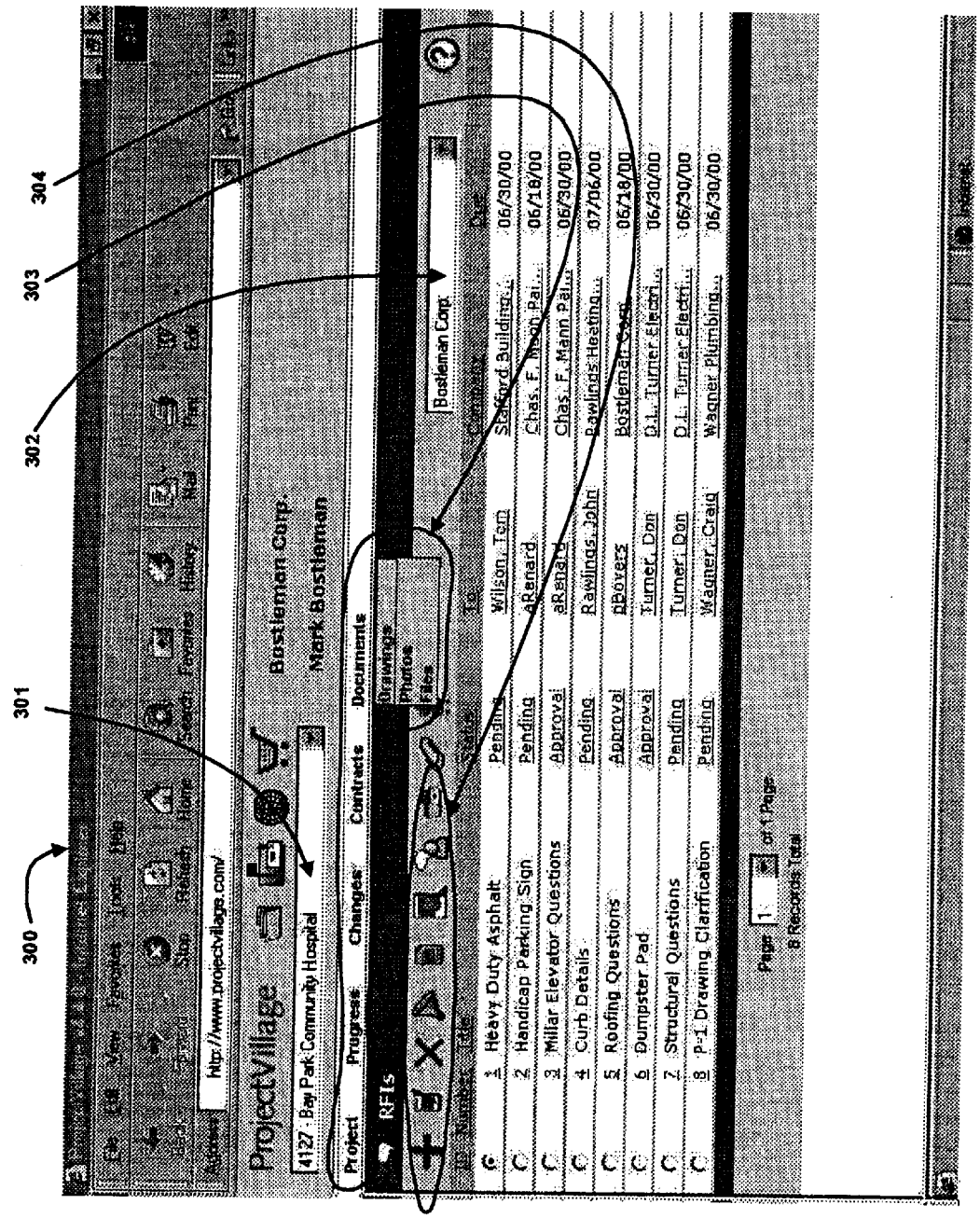
FIG. 10 is a screen snapshot of a User Interface screen for an Enterprise Community system.

Because of the inter-organizational mingling of data and the potential redundancy of application module types, it is important in an Enterprise Community system that the user interface provide the user with the functionality to navigate between the application modules based on the project they are associated with as well as each of their organizational account sources. Referring now to FIG. 10, a depiction of one screen snapshot 300 of the Enterprise Community system User Interface screen 102 is shown. In this screen snapshot 300, a project selection list 301 contains all of the projects in which at least one organizational account has granted the logged on user at least the permission to view at least one application module. An organizational account selection list 302 contains all of the organization accounts that have granted the logged on user the permission to at least view at least one application module associated with the selected project. Application module selection lists 303 contain all of the application modules associated with the selected project in which the logged on user has been granted the permission to at least view by the organizational account selected in the organizational account selection list 302. The logged on user may have been granted various permissions other than view. The existence of these other permissions are generally visible by the appearance of various icons on the toolbar 304 which allow the user to add, modify and delete data as well as to move pieces of the data through workflow processes.

Other embodiments are within the scope of the invention. For example, this system has been described as being carried out in software. It can be alternately carried out using hardware techniques where dedicated modules are used to carry out each function that has been described above. Likewise, any step described above can be replaced with one or more steps, or can be removed, to perform the Enterprise Community system. Alternate steps can be used for each task and to monitor the status of each project in the Enterprise Community system. Still other embodiments are within the scope of the following claims.

The ProjectVillage™ application is a web-based construction project management application that was built by the inventors based on an Enterprise Community structure of the present invention and is currently being used by teams of construction professionals.

Figure 6:
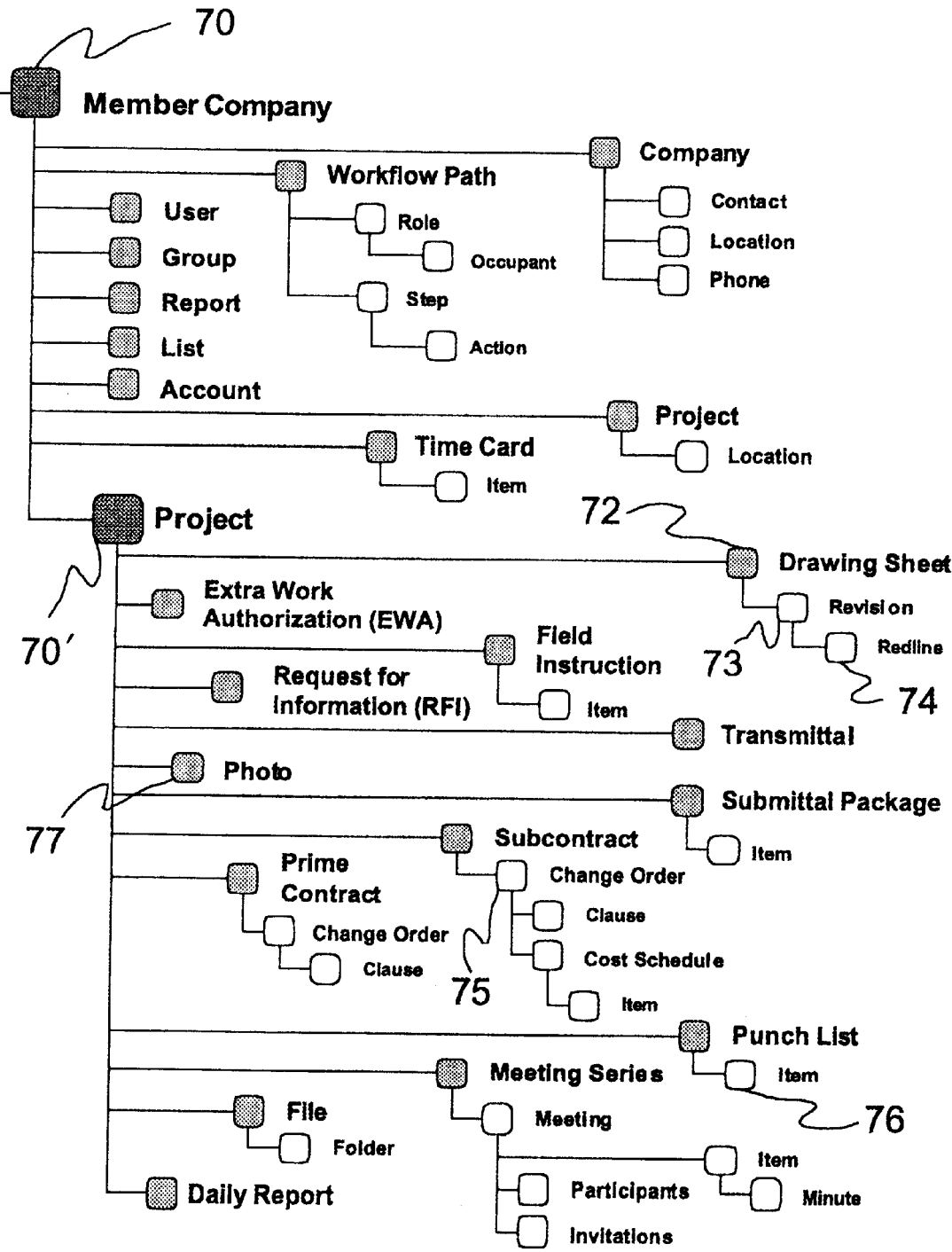
FIG. 6 is a block diagram of an Enterprise Community system object model illustrating various needed or desired databases and work areas.

FIG. 6 shows a block diagram of the database object model for the ProjectVillage™ application of the Community Enterprise system of the present invention. The two dark gray nodes, 70 and 70', are not actual data objects, but logical groupings of data objects and represent the two main levels of the application. When a user is logged into the system, the user will, based on his own navigation at any time, be at either the Member Company level 70 or at the Project level 70', in which case the user has selected to be logged into in a specific project. At either level, the user then has available the application modules within that level and the data objects, such as 72, 73 and 74, that they expose. Each light gray node, such as 72, is the base data object of an application module. Therefore, each application module is represented by a light gray node 72 in this diagram. The white nodes, such as 73 and 74, represent child data objects related to their parent objects in either a one-to-one or a one-to-many relationship. For instance, the drawings application module contains any number of drawing sheet data objects 72. Each drawing sheet data object contains any number of revision data objects 73 each of which in turn contains any number of redline data objects 74. Any one of the data objects in this diagram is represented in the user interface by its own graphic icon and is manipulated or viewed by its own add/modify or read-only detail screen.

Figure 8:
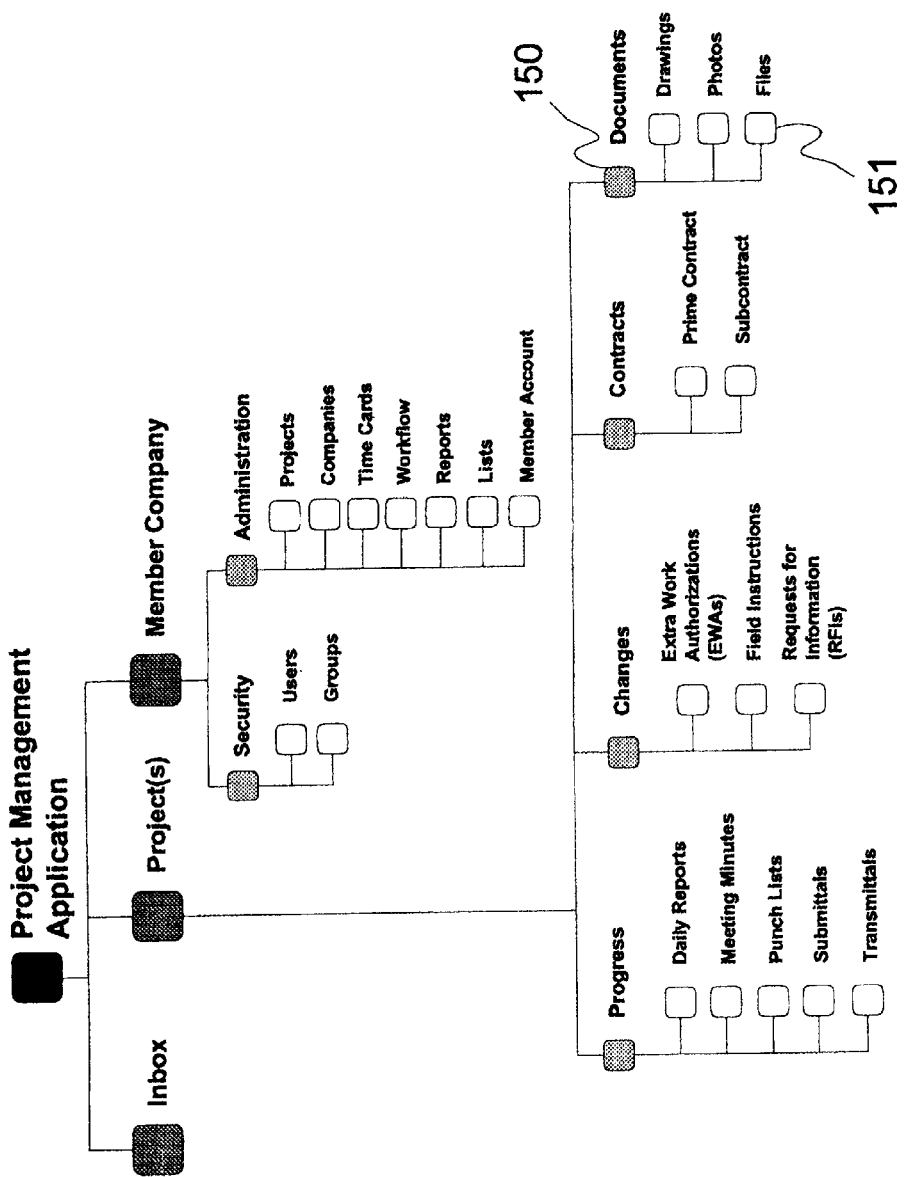
FIG. 8 is a block diagram of a menu structure for an Enterprise Community system.

FIG. 8 shows the menu structure for the ProjectVillage™ application and, for an organizational account or a specific project, the application modules 151 that can be accessed via the menus 150.

Figure 12:
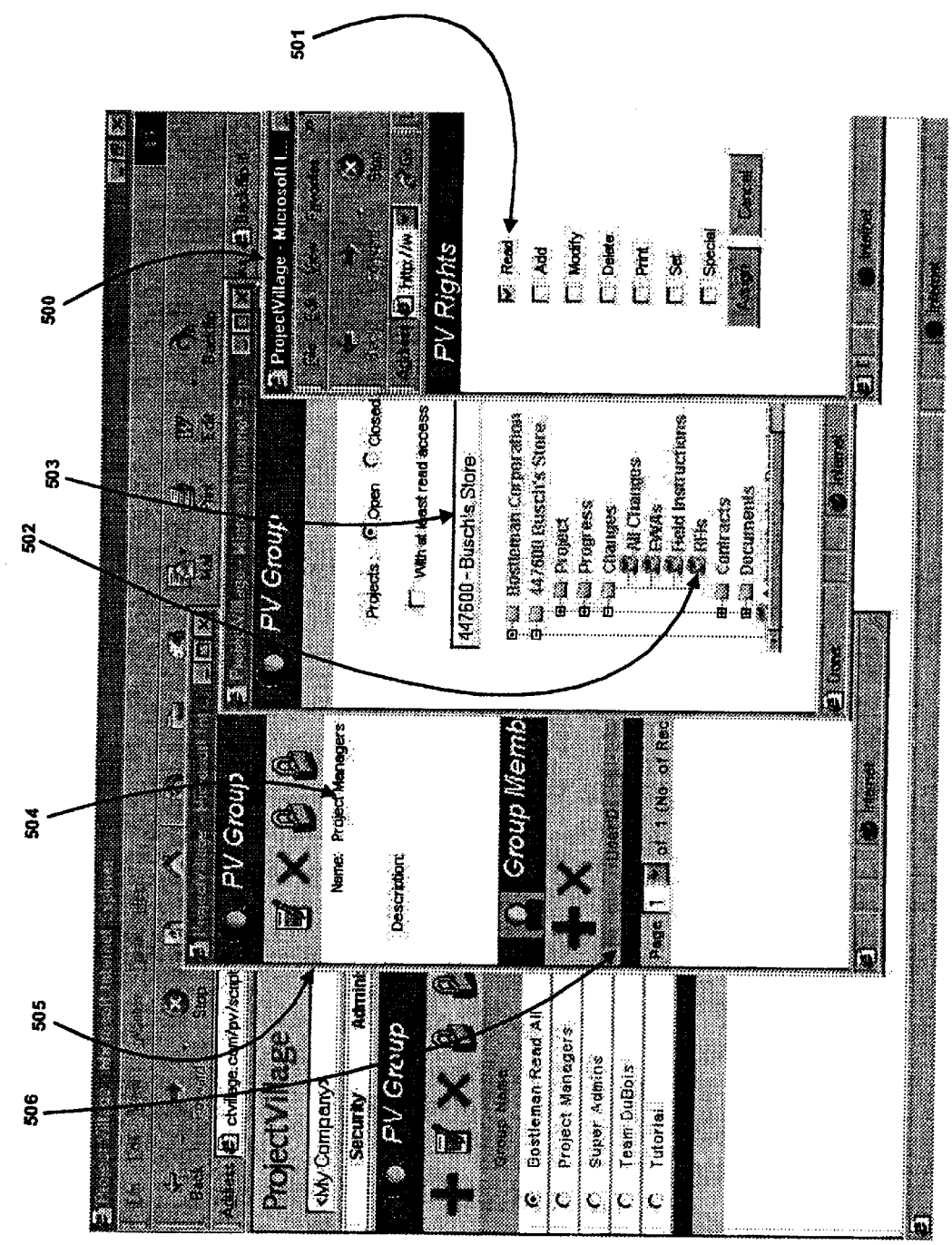
FIG. 12 is a screen snapshot of a Permission Modify screen for an Enterprise Community system.

Security permissions to various application modules are granted within the ProjectVillage™ application from the groups application module. The groups application module is a listing of security groups, each of which can be created and named by users of the system within their organizational account. Any number of users, from the same or any other organizational account, can be added to a security group. Security permissions can then be granted to the group, at which point the permissions are inherited by the users contained in the group. FIG. 12 shows the Permission Modify screen 500, on which the read permission 501 is being granted for the RFI application module 502 in project "447600 Busch's Store" 503 to the security group "Project Managers" 504. Though permissions are being granted to this group, the user list 506 at the bottom of the group detail screen 505 shows that this group does not currently contain any users.

Figure 12A:
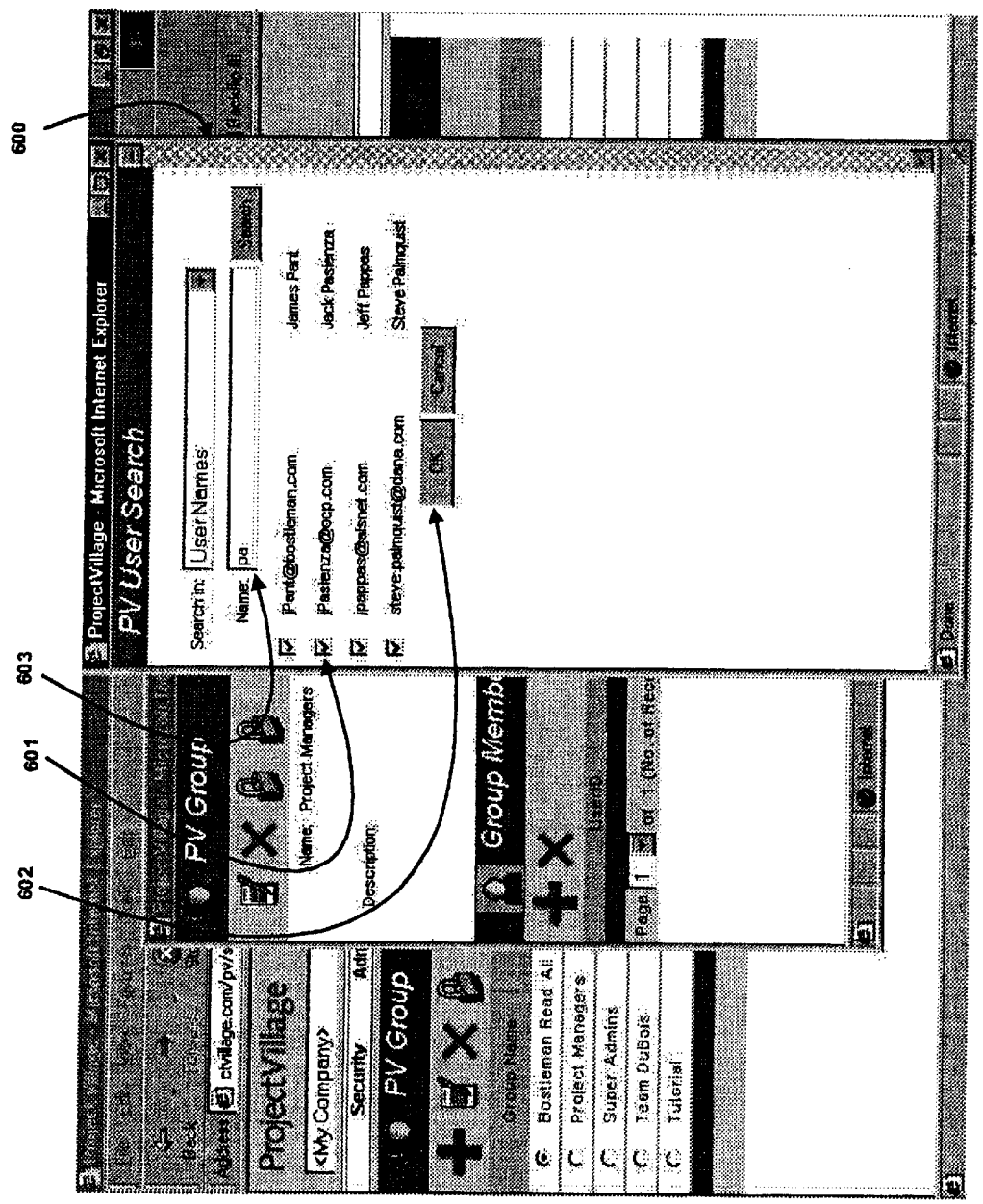
FIG. 12A is a screen snapshot of a Modify Group Membership screen for an Enterprise Community system.

FIG. 12A shows the process of adding users to a group within the ProjectVillage™ application. The Modify Group Membership screen 600 lists all of the users that match a search criteria 603. By checking any number of the checkboxes 601 next to the usernames and confirming the selection with the OK button 602 the selected users are added to the "Project Managers" group 504 shown in FIG. 12. Because the Modify Group Membership screen 600 lists users regardless of their organizational account, it effectively enables the Enterprise Community system by allowing the inclusion of users from other organizational accounts in security groups and thus the ability to grant foreign permissions 230 or 231. FIG. 12A shows an example of this in which the Modify Group Membership screen 600 lists four users from four different organizations. In an application built on the prior art Project Specific model this list would return only those users created within a specific project. In the prior art Enterprise model application, this list would return only those users created in the local organizational account.

The ProjectVillage™ application provides the following numerous features that leverage the Enterprise Community structure to provide greater value to the users of the application.

Online Workflow.

A number of items within the application modules provided by the ProjectVillage™ application are "workflow"

items that are routed from user to user, online, creating work processes that generally involve an approval, a comment or a response. A Request for Information (RFI), for instance, is a formal process in which an individual or organization requests additional information (or a clarification of existing information) from another individual or organization higher in the management or design chain. In the construction industry this would be from a subcontractor to a general contractor, or from a general contractor to an architect or, perhaps, from an architect to an owner. In the ProjectVillage™ application, for example, an RFI might be created by a general contractor's project manager. After completing the request portion in the RFI form, the project manager would submit the RFI, online, to the architect's designer. Besides appearing in the RFI application module, it now also appears in the designer's Inbox because it is "in-his-court". At this point, the designer can complete the response portion of the RFI form online. In this example, the entire RFI workflow process is executed online, without paper, faxes or mail and, probably, in less time than the offline equivalent. More importantly, though, assuming that the project manager and designer are users from two different organizational accounts, the ProjectVillage™ application leverages the Enterprise Community model by allowing this workflow process to be executed across the boundaries of the organizational accounts.

Custom Workflow Design.

Any workflow item, when created, is assigned a "workflow path" which can be created and modified by each organization. A workflow path serves to shepherd the item through any number of workflow steps, enforcing the policies of each step including what actions users can take and what other users are acceptable recipients of the item. While many workflow paths reflect industry standard business processes, it is necessary in some situations to create a workflow path that differs from the industry standard. For instance, RFIs are typically created by the general contractor and sent to the architect for a response. However, if desired, a workflow path for RFIs could be created in which an individual from either a subcontractor's or general contractor's organizational account creates the RFI. If an individual in the subcontractor's organizational account creates the RFI (and completes the request portion of the form), the workflow path could require that the RFI be sent only to certain individuals in the general contractor's organizational account. At this step, the workflow path could allow the individuals from the general contractor's organizational account to complete the response portion of the RFI form, or send it to certain individuals in the architect's organizational account for a response. If, on the other hand, an individual from the general contractor's organizational account creates the RFI, he would only be able to send it to certain individuals from the architect's organizational account for a response. The Enterprise Community system of the present invention significantly enhances customizable workflow. Just as one organizational account can apply security permissions against users from other organizational accounts, so can one organizational account include users from other organizational accounts as potential recipients of workflow items.

The Navigator.

Figure 11:
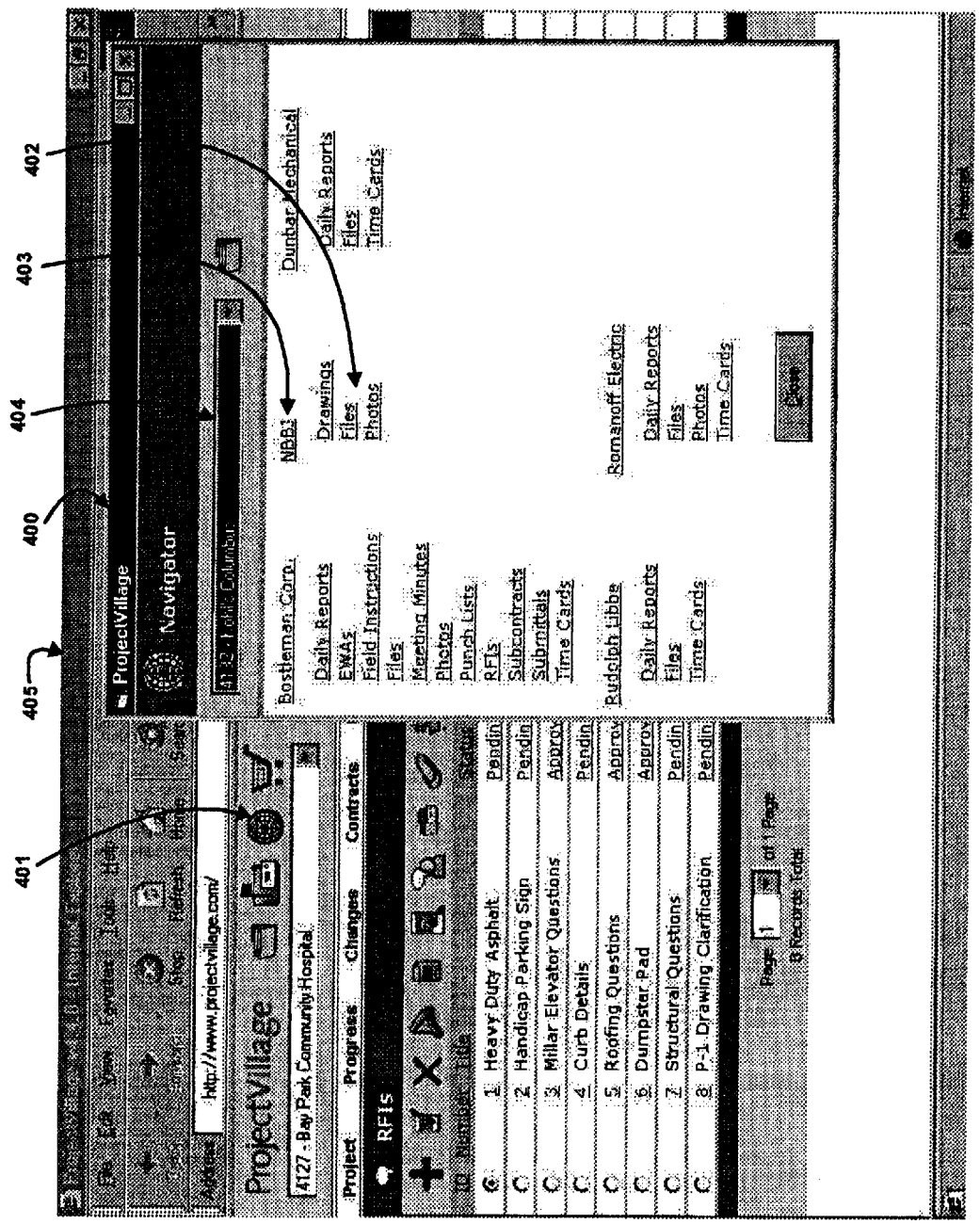
FIG. 11 is a screen snapshot of a Navigator screen for an Enterprise Community system.

Referring to FIG. 11, in addition to the functionality of the user interface described above, the ProjectVillage™ application provides an alternative navigational screen called the Navigator screen 400 which can be accessed by the Navigator icon button 401 on the main screen 405. In terms of the user interface, the Navigator screen 400 is the best visual illustration of the Enterprise Community system. For the user logged onto the system, the Navigator screen 400 shows all of the application modules 402 to which he has been granted at least the permission to view by any organizational account. The application modules are then grouped by the organizational accounts 403 from which they are published. The application modules and organizational accounts are associated with the project selected in the project selection list 404. Each time a different project is selected from the project selection list, the user's security permissions are re-evaluated throughout all organizational accounts in the Enterprise Community system and a new layout of application modules and organizational containers are displayed on the Navigator screen 400 pertaining to the newly selected project. When the user clicks an application module on the Navigator screen 400 with a mouse or other pointing device, the Navigator screen 400 disappears and causes the main screen 405 to switch either or both the project and publishing organizational account, ultimately displaying the information for the application module that the user clicked.

Attachments.

As described previously, each of the data objects in FIG. 6, such as 72, 73 and 74, is represented in the user interface by its own graphic icon and is manipulated or viewed by its own add/modify or read-only detail screen. The user interface also provides a screen for each object on which a list of other objects can be attached, or cross referenced to that object. For instance, a punch list item object 76 and a photo object 77 may be attached to a subcontract change order object 75. Because of the Enterprise Community system, in the example above, the punch list item could be from one organizational account while the photo could be from a second organizational account and the subcontract change order could be from a third organizational account. Furthermore, each of these three objects could even be from different projects, if desired.

Drawing Viewing and Redlining.

Each revision in the drawings application module can store the actual CAD file of that drawing. The inventors have integrated into the ProjectVillage™ application a drawing viewer so that any revision can then be viewed online. In addition to simply viewing the drawings, users can create graphical sketches and blocks of text on top of the drawings. These sketches and text blocks are called redlines, or markups. Again, leveraging the Enterprise Community model, multiple users from multiple organizational accounts can, given sufficient local and foreign permissions between the accounts, view drawings and share markups with each other.

Enterprise Scalability.

The ProjectVillage™ application is able to contain and easily navigate all of a company's projects, which provides a common location and interface for all project information within an organization as well as the ability to aggregate and report on data across projects. Because of the Enterprise Community system, the information for all of an organization's projects can be kept within its organizational account regardless of partnerships with other organizations for any given project. This is a significant enhancement for project management systems given the shortcomings of the Project Specific and Enterprise models in this regard.

Smart self-hosted servers.

The primary means of distribution of the ProjectVillage™ software is as a subscription service, running on a central server from which any number of organizations can log in and use the software. However, for some organizations, especially larger ones, there are several benefits to purchasing and installing their own copy of the software on their own servers. First, an organization has direct control over physical security and access to the database. Second, performance and response time of the software is dramatically increased when run over an organization's LAN as opposed to over the Internet. Finally, since the organization has direct access to the database, self-hosting opens a variety of opportunities for custom solutions that integrate the data and processes from the ProjectVillage™ application with that of other systems such as accounting, human resources, inventory, manufacturing, etc. By its nature, a self-hosted server holds only one organizational account. However, to maintain the Enterprise Community system, self-hosted servers communicate with the central ProjectVillage™ server, making the central server aware of the location of the self-hosted server as well as providing the central server with an index of the information and security permissions that is on the self-hosted server. This index of information allows the central server to know about the information and permissions available on any given self-hosted server without actually storing the information itself. In this way, the Enterprise Community system is kept intact, allowing organizational accounts running on the central server to share information with accounts on any self-hosted server and vice versa.

Other embodiments are within the scope of the invention. For example, this system has been described as being carried out in software. It can be alternatively carried out using hardware techniques where dedicated modules are used to carry out each function that has been described above. Likewise, any step described above can be replaced with one or more steps, or can be removed, to perform the enterprise community system. Alternative steps can be used for each task and to monitor the status of each project in the enterprise community system.

Still other embodiments are within the scope of the following claims.

We claim:

1. A method for managing and selectively sharing multiple sets of information to be used in a plurality of projects, each set of information being created, revised and controlled by separate entities, the method executed in a computer system, said method comprising receiving, storing, and analyzing in one instance of a database at least one first set of information from at least a first entity, the first set of information capable of being retrievable, usable and revisable by the first entity;

allowing the first entity to control whether at least one second entity can access the first set of information, and allowing the first entity to control whether the second entity can retrieve, use and/or revise the first set of information;

receiving, storing, and analyzing in the database at least one second set of information from the first entity, the second set of information capable of being retrieved, used and revised only by the first entity;

receiving, storing, and analyzing in the database at least one third set of information from the second entity; the third set of information capable of being retrieved, used and revised by the second entity;

allowing the second entity to control whether at least the first entity can access the third set of information and allowing the second entity to control whether the first entity can retrieve, use and/or revise the second set of information; and receiving, storing and analyzing in the database at least one fourth set of information capable of being retrieved, used and revised only by the second entity, wherein the method supports the ability for all entities to co-exist on the single instance of the database such that each entity owns and controls only their set of information within the database; in which multiple sets of information are received, stored and analyzed from multiple entities, and allowing each entity to control whether the other entities can retrieve, use and/or revise the stored sets of information and in which analyzing of the information further includes updating a status of each set of information, and sending the status of each undated set of information to each entity that is capable of retrieving, using and/or revising the undated set of information.

2. The method of claim 1, in which the analyzing of the information is performed using a predetermined and customizable path.

3. The method of claim 1, further including allowing each entity to grant permissions to other entities to receive, store and/or analyze the sets of information under the control of each entity.

4. The method of claim 3, in which the at least first entity is a member of a first organization and the at least second entity is a member of a second organization that is different from the first organization.

5. The method of claim 1, in which the receiving, analyzing and storing of the multiple sets of information are performed on a network computer.

6. The method of claim 1, in which the receiving, analyzing and storing of the multiple sets of information are performed with a computer code operating on a suitable database.

7. The method of claim 6, in which the computer code is written in a language comprising Visual Basic, C++ or Java.

8. A computer-readable medium having computer-executable instructions for performing the steps recited in claim 1.

9. A software program for a multiple project managing system which controls access to multiple sets of information for use in a plurality of projects, each set of information being created, revised and controlled by separate entities, the software program comprising instructions for causing a computer to:

receive, store, and analyze in a single instance of a database at least one first set of information from at least a first entity using an electronic user interface, the first set of information being capable of being retrievable, usable and revisable by the first entity;

allow the first entity to control whether at least one second entity can access the first set of information;

allow the first entity to control whether the second entity can retrieve, use and/or revise the first set of information;

receive, store and analyze in the database at least one second set of information from the first entity, the second set of information being capable of being retrieved, used and revised only by the first entity;

receive, store, and analyze in the database at least one third set of information from the second entity; the third set of information being capable of being retrieved, used and revised by the second entity;

allow the second entity to control whether the first entity can access the third set of information;

allow the second entity to control whether the first entity can retrieve, use and/or revise the second set of information; and receive, store and analyze in the database at least one fourth set of information from the second entity, the fourth set of information being capable of being retrieved, used and revised only by the second entity, wherein the software program supports the ability for all entities to co-exist on the single instance of the database such that each entity owns and controls only their set of information within the database, wherein the software program allows multiple entities to send, store and analyze multiple sets of information in the database, and allowing each entity to control whether the other entities can retrieve, use and/or revise the stored sets of information, and in which analyzing of the information further includes updating a status of each set of information, and sending the status of each undated set of information to each entity that is capable of retrieving, using and/or revising the undated set of information.

10. The program of claim 9, in which the analyzing of the information is performed using a predetermined and customizable path.

11. The program of claim 9, further including allowing each entity to grant permissions to other entities to receive, store and/or analyze the sets of information under the control of each entity.

12. The program of claim 11, in which the at least first entity is a member of a first organization and the at least second entity is a member of a second organization that is different from the first organization.

13. The program of claim 9, in which the receiving, analyzing and storing of the multiple sets of information are performed on a network computer.

14. The program of claim 9, in which the receiving, analyzing and storing of the multiple sets of information are performed with a computer code operating on a suitable database.

15. The program of claim 14, in which the computer code is written in a language comprising Visual Basic, C++ or Java.

16. A computer-readable medium having computer-executable instructions for performing the steps recited in claim 9.

17. A method for managing and selectively sharing multiple sets of information to be used in a plurality of projects, each set of information being created, revised and controlled by multiple separate entities, the method executed in a computer system, the method comprising receiving at least one first set of information and at least one second set of information from at least a first entity using an electronic user interface;

analyzing and storing the first and the second sets of information in a single instance of a database;

allowing at least a second entity to retrieve, use and/or revise the first set of information, while prohibiting the second entity from at least one of the retrieving, using or revising of the second set of information;

receiving at least one third set of information and at least one fourth set of information from the second entity using an electronic user interface;

analyzing and storing the third and the fourth sets of information in the database;

allowing the first entity to retrieve, use and/or revise the third set of information, while prohibiting the first entity from at least one of retrieving, using or revising of the fourth set of information, wherein the method supports the ability for all entities to co-exist on the single instance of the database such that each entity owns and controls only their set of information within the database, in which multiple sets of information are received, stored and analyzed from multiple entities, and allowing each entity to control whether the other entities can retrieve, use and/or revise the stored sets of information, and in which analyzing of the information further includes updating a status of each set of information, and sending the status of, each undated set of information to each entity that is capable of retrieving, using and/or revising the undated set of information.

18. The method of claim 17, in which the analyzing of the information is performed using a predetermined and customizable path.

19. The method of claim 17, further including allowing each entity to grant permissions to other entities to receive, store and/or analyze the sets of information under the control of each entity.

20. The method of claim 19, in which the at least first entity is a member of a first organization and the at least second entity is a member of a second organization that is different from the first organization.

21. The method of claim 17, in which the receiving, analyzing and storing of the multiple sets of information are performed on a network computer.

22. The method of claim 17, in which the receiving, analyzing and storing of the multiple sets of information are performed with a computer code operating on a suitable database.

23. The method of claim 22, in which the computer code is written in a language comprising Visual Basic, C++ or Java.

24. A computer-readable medium having computer-executable instructions for performing the steps recited in claim 17.

25. A method for managing and selectively sharing information in a single instance of a multiuser network environment of the type having at least one database server with at least one file directed for selective shared usage, and multiple entitles interconnected through the database server through a network link, each entity creating at least one set of information and controlling access by other entities to at least one subset of that information, the method comprising receiving at least one first set of information and at least one second set of information from at least a first entity using at least one electronic user interface;

storing the first and the second sets of information in a database;

allowing at least a second entity to retrieve, use and/or revise the first set of information, while prohibiting the second entity from at least one of the retrieving, using or revising of the second set of information;

receiving at least one third set of information and at least one fourth set of information from the second entity using at least one electronic user interface;

storing the third and the fourth sets of information in the database; and allowing the first entity to retrieve, use and/or revise the third set of information, while prohibiting the first entity from at least one of retrieving, using or revising of the fourth set of information, wherein the method supports the ability for all entities to co-exist on the single instance of the database such that each entity owns and controls only their set of information within the database, in which multiple sets of information are received, stored and analyzed from multiple entities, and allowing each entity to control whether the other entities can retrieve, use and/or revise the stored sets of information, and in which analyzing of the information further includes updating a status of each set of information, and sending the status of each undated set of information to each entity that is capable of retrieving, using and/or revising the undated set of information.

26. The method of claim 25, in which the analyzing of the information is performed using a predetermined and customizable path.

27. The method of claim 25, further including allowing each entity to grant permissions to other entities to receive, store and/or analyze the sets of information under the control of each entity.

28. The method of claim 27, in which the at least first entity is a member of a first organization and the at least second entity is a member of a second organization that is different from the first organization.

29. The method of claim 25, in which the receiving, analyzing and storing of the multiple sets of information are performed on a network computer.

30. The method of claim 25, in which the receiving, analyzing and storing of the multiple sets of information are performed with a computer code operating on a suitable database.

31. The method of claim 30, in which the computer code is written in a language comprising Visual Basic, C++ or Java.

32. A computer-readable medium having computer-executable instructions for performing the steps recited in claim 25.

33. A business method for one or more entities for managing multiple projects and selectively sharing information comprising creating at least one or more accounts within a single instance of an application wherein each entity creates and controls at least one or more of the following sets of information including: at least one or more projects, at least one or more application modules, at least one or more security permissions and at least one or more users;

allowing each entity to create any number of projects, each specific project having a number of application modules associated with the specific project that contain and process at least one or more sets of information;

allowing each entity to grant at least one foreign permission to a user to retrieve, use and/or revise the information; and, creating a super project when the foreign permission is granted to the user, the super project being a common channel upon which the various application modules from each entity can be merged into at least one set of super modules, wherein the method supports the ability for all entities to co-exist on the single instance of the application such that each entity owns and controls only their set of information within the application, in which multiple sets of information are received, stored and analyzed from multiple entities, and allowing each entity to control whether the other entities can retrieve, use and/or revise the stored sets of information, and in which analyzing of the information further includes updating a status of each set of information, and sending the status of each undated set of information to each entity that is capable of retrieving, using and/or revising the undated set of information.

34. The method of claim 33, in which the analyzing of the information is performed using a predetermined and customizable path.

35. The method of claim 33, further including allowing each entity to grant permissions to other entities to receive, store and/or analyze the sets of information under the control of each entity.

36. The method of claim 35, in which the at least first entity is a member of a first organization and the at least second entity is a member of a second organization that is different from the first organization.

37. The method of claim 33, in which the receiving, analyzing and storing of the multiple sets of information are performed on a network computer.

38. The method of claim 33, in which the receiving, analyzing and storing of the multiple sets of information are performed with a computer code operating on a suitable database.

39. The method of claim 38, in which the computer code is written in a language comprising Visual Basic, C++ or Java.

40. A computer-readable medium having computer-executable instructions for performing the steps recited in claim 33.

* * * * *